June 11, 1968  R. SMITH  3,387,820
TURBINE ENGINE CONSTRUCTION
Filed May 24, 1965  2 Sheets-Sheet 1

INVENTOR
RAYMOND SMITH

BY Hauke & Hauke
ATTORNEYS

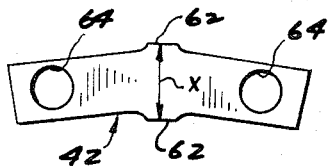
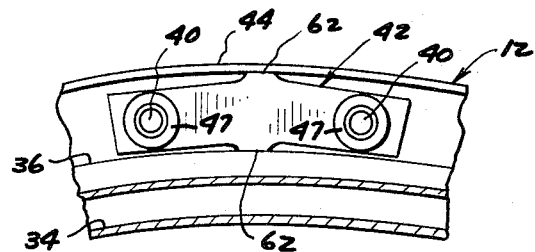
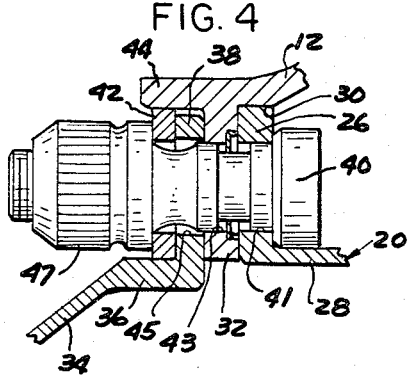

United States Patent Office 3,387,820
Patented June 11, 1968

3,387,820
TURBINE ENGINE CONSTRUCTION
Raymond Smith, Detroit, Mich., assignor to Continental Aviation & Engineering Corporation, Detroit, Mich., a corporation of Michigan
Filed May 24, 1965, Ser. No. 458,121
4 Claims. (Cl. 253—39)

ABSTRACT OF THE DISCLOSURE

A means for maintaining concentricity between two axially flanged annnular members such as a shroud and a housing of a turbine engine including a plurality of washer members having arcuately formed surfaces which are adapted to be disposed between the axial flanges of the annular members.

---

Figure 1:
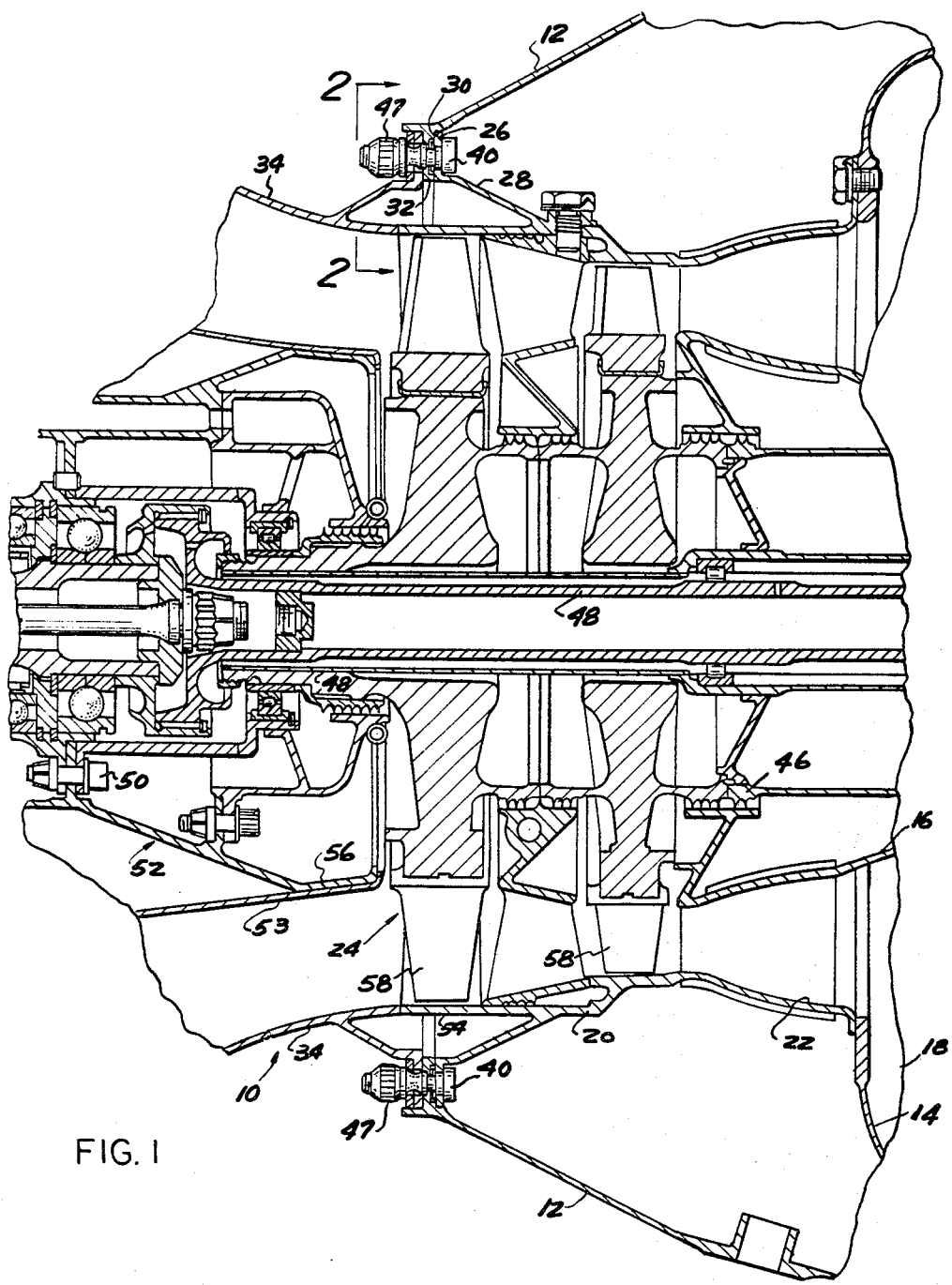

The present invention relates to turbine engines and more particularly to a new means for insuring that the turbine assembly of such engines will be assembled concentrically within the shroud structure which encompasses the turbine engine.

To insure efficient utilization of the turbine assembly of turbine engines it is essential that such engines be constructed to provide rather close clearances between the tips of the turbine blades and the shroud structure which encompasses the turbine assembly. To permit close clearances it is essential that the turbine assembly be concentrically mounted within the shroud structure. The turbine blades and the shroud structure are subjected to the intense heat of combustion gases and if close clearances are attempted without insuring that the turbine assembly and the shroud structure are concentrically mounted, the thermal distortion and warpage of these members during operation of the engine could cause contact between the tips of the turbine blades and the shroud structure and damage to the engine.

The present invention provides a new means of assembling turbine engines to insure concentricity as the turbine assembly and shroud structure are mounted in place. A plurality of shim members are provided and dimensioned to provide the proper clearances between the tips of the turbine blades and the shroud structure. With the bolts which mount the turbine assembly loosened and the bolts which mount the shroud structure to the engine housing structure and the exhaust housing structure removed the shim members are positioned intermediate the tips of the turbine blades and the shroud structure.

The turbine assembly bolts are then tightened to center the turbine assembly within the shroud structure and to move the shroud structure and the engine housing structure relative to the exhaust structure to a position in which the desired clearances are provided between the tips of the turbine blades and the shroud structure.

A plurality of uniquely formed washer members are provided having bearing surfaces which when the washers are inserted over the housing bolts engage between the engine housing structure and the exhaust housing structure to produce a proper radial positioning of these members and to thus position the shroud structure concentrically with respect to the tips of the turbine blades. The washer members are provided in different sizes so that by a proper selection from the available sizes the shrould structure can be positioned to produce the desired clearances between the shroud structure and the tips of the turbine blades.

After the turbine assembly has been mounted in place and the shroud structure thus disposed in the proper position, the washer members are selected which will maintain this position and are marked. The turbine assembly is then removed to permit removal of the shims, the turbine assembly is then again mounted in position and the proper washer members are inserted in position between the engine housing structure and the exhaust housing structure. Tightening the housing bolts then will provide a proper positioning between these members and thus a proper positioning between the tips of the turbine blades and the shroud structure.

It is an object then of the present invention to improve the efficiency of turbine engines by providing means permitting close clearances to be provided intermediate the tips of the turbine blades for such engines and the shroud structures which encompasses the turbine blades.

It is another object of the present invention to insure that the turbine assembly and the shroud structure encompassing the turbine assembly of turbine engines will be concentrically assembled by providing a new washer member adapted to be positioned between the exhaust housing structure and the engine housing structure to maintain the shroud structure in a position relative to the exhaust housing structure which will position the shroud structure concentrically about the turbine assembly.

It is another object of the present invention to insure that the turbine assembly and the shroud structure encompassing the turbine assembly of turbine engines will be concentrically assembled by providing a new method of assembling such engines.

Still further objects and advantages of the present invention will be readily apparent to one skilled in the art to which the invention pertains upon reference to the following drawings in which like reference characters refer to like parts throughout the several views and in which, FIG. 1 is a fragmentary longitudinal cross-sectional view of a portion of a turbine engine utilizing the present invention, FIG. 2 is a fragmentary sectional view taken substantially on line 2—2 of FIG. 1, FIG. 3 is an enlarged side elevational view of the washer member of the present invention, and FIG. 4 is an enlarged detail view of a portion of the structure shown in FIG. 1.

Now referring to the drawings for a more detailed description of the present invention, FIG. 1 illustrates a portion of a turbine engine generally indicated at 10 as comprising a substantially annular housing structure 12. An outer annular combustor housing 14 and an inner annular combustor housing 16 define a combustion chamber 18 and in combination with a shroud structure 20 also defines a turbine inlet nozzle 22 opening to a turbine assembly generally indicated at 24.

As can best be seen in FIG. 4, the shroud structure 20 is provided with a flange portion 26 extending radially outwardly from an inner axially extending flange portion 28. The housing structure 12 is provided with an axially extending seat 30 and a radially inwardly extending flange portion 32 adapted to receive the flange portion 26 of the shroud structure 20 by bolts 40. An annular exhaust housing structure 34 is provided with an axially extending flange portion 36 and a radially outwardly extending flange portion 38. The shroud structure 20, the housing structure 12, and an exhaust housing 34 are provided with annularly spaced and aligned holes 41, 43 and 45 respectively to receive the bolts 40 with the holes 45 of the exhaust housing structure 34 being radially enlarged somewhat as shown. Washer members 42, which will be described in greater detail below, are carried by the bolts 40 exteriorly of the exhaust housing structure 34 intermediate the flange portion 36 and an axial extension 44 of the housing structure 12. Uuts 47 are provided for the bolts 40.

As shown in FIG. 1, the turbine engine further comprises a shaft 46 supported by the engine housing structure 12 and extending axially through the shroud structure 20 and the exhaust housing structure 34. The turbine assembly 24 is mounted in position by a plurality of bolts 50 which secure retaining means generally indicated at 52 in a position to be supportingly engaged by a portion 53 of the exhaust housing structure 34.

A hollow power shaft 48 is rotatably supported and mounted in position by the bolts 50. As is clear in FIG. 1, the radial positioning of the turbine assembly 24 on the power shaft 48 is secured by means of a common support using the bolts 50. The turbine assembly 24 and the power shaft 48 are supported through the engagement of the portion 53 of the exhaust housing structure 34 and an inner housing member 56 which forms part of the retaining means 52. The shroud structure 20 is provided with an annular axially extending portion 54 which extends closely adjacent the tips of turbine blades 58 which are a part of the turbine assembly 24.

It is apparent that since the shroud structure 20 is mounted to the engine housing structure 12 and the turbine assembly 24 is supported through the retaining means 52 by the exhaust housing structure 34, a proper relative radial positioning of the housing structure 12 and the exhaust housing structure 34 will produce a corresponding proper relative radial positioning of the portion 54 and the tips of the turbine blades 58.

As can best be seen in FIG. 3, the washer members 42 preferably are arcuate in plan view and are provided with transverse medial projections 62. The projections 62 are of different linear dimensions for different washer members 42 so that the lateral dimension X of the washer members 42 will vary for different washer members 42 within a predetermined selected range. The washer members 42 are preferably provided with through holes 64 which as can best be seen in FIG. 2 are spaced to receive adjacent bolts 40. With the washer members 42 in position the projections 62 engage the flange portion 44 of the housing structure 12 and the flange portion 36 of the exhaust housing structure 34 to produce a relative radial positioning of these members which will depend on the dimension X of the individual washer members 42 selected.

The turbine engine 10 is assembled as follows: With the nuts 47 removed shim stock (not shown) is positioned intermediate the tips of the turbine blades 58 and the axially extending portion 54 of the shroud structure 20. The exhaust housing structure 34 is then inserted over the turbine assembly 24. The shim stock will produce a relative radial positioning of the housing structure 12 and the exhaust housing structure 34 through the retaining means 52 which will produce the desired clearance between the portion 54 of the shroud structure 20 and the tips of the turbine blades 58.

Washer members 42 are then selected having a dimension X which will provide the proper spacing between the flange portion 44 of the housing structure 12 and the flange portion 36 of the exhaust housing structure 34. Since the dimension X of the particular washer members 42 necessary to produce the proper relative positioning of the housing structure 12 and the exhaust housing structure 34 may vary at each arcuate position the washer member 42 to be used at each position is marked. The exhaust housing structure 34 is then removed to permit removal of the shim stock. The exhaust housing structure 34 is reinstalled, the proper washer members 42 are inserted in place and the nut members 47 tightened to complete the assembly.

It is apparent that the present invention provides a means of insuring that the turbine assembly 24 will be concentrically mounted within the shroud structure 20. The particular means disclosed permits the use of shim stock for providing a desired clearance between the tips of the turbine blades and the shroud structure 20 and insures that once the shim stock has been removed and the turbine engine assembled, the desired clearance will be maintained. Without the washer members 42 there would be no way to insure that the relative radial positioning of the engine housing structure 12 and the exhaust housing structure 34 would be finally bolted in a position which would maintain the desired concentricity.

It is further apparent that although I have described but a single embodiment of my invention many changes and modifications can be made therein without departing from the spirit of the invention as expressed by the appended claims.

I claim:

1. In a turbine engine having a turbine assembly, an engine housing carrying said turbine assembly, a shroud structure encompassing said turbine assembly and means mounting said shroud structure to said engine housing in a position concentrically disposed with respect to said turbine assembly said means comprising,
   (a) said shroud structure being provided with an axially extending flange and a radially outwardly extending flange portion,
   (b) said engine housing being provided with an axially extending flange and a radially inwardly extending flange portion,
   (c) means comprising a plurality of bolts positioned annularly about said radially extending flange portions and clamping radially extending surfaces of said radially extending flange portions one to the other, and
   (d) a plurality of washer members carried by said bolts and clamped thereby against one of said radially extending flange portions, each of said washer members having radially separated arcuate bearing surfaces respectively engaging said axially extending flanges to relatively radially position said engine housing and said shroud structure, and washer members being provided with at least two annularly spaced holes and being secured in position by a pair of adjacent bolts extending through said holes.

2. The combination as defined in claim 1 and in which said bearing surfaces are disposed intermediate said holes.

3. Means for relatively radially positioning one annular member with respect to another annular member, said means comprising,
   (a) one of said annular members being provided with an axially extending flange and a radially outwardly extending flange portion,
   (b) said other annular member being provided with an axially extending flange and a radially inwardly extending flange portion,
   (c) means securing said radially extending flange portions together,
   (d) means disposed intermediate said axially extending flanges and engaging same for relatively radially positioning said annular members,
   (e) said last mentioned means comprising a plurality of washer members each provided with radially separated bearing surfaces respectively engaging said axially extending flanges,
   (f) said securing means comprising annularly spaced bolts and said washer members being each carried by a pair of adjacent bolts.

4. The combination as defined in claim 3 and in which the radial dimension between said bearing surfaces is different for some of said washer members.

References Cited

UNITED STATES PATENTS

| 2,466,602 | 4/1949 | Lombard et al. | 285—175 |
| 3,104,091 | 9/1963 | Vivian | 253—39 |
| 3,243,158 | 3/1966 | Desmond | 253—39 |
| 3,269,677 | 8/1966 | Stoeckly | 253—39 X |
| 2,563,269 | 8/1951 | Price. | |
| 2,764,266 | 9/1956 | Haworth | 287—129 X |

FOREIGN PATENTS

| 615,208 | 6/1935 | Germany. |
| 668,715 | 3/1952 | Great Britain. |
| 728,400 | 4/1955 | Great Britain. |

EVERETTE A. POWELL, Jr., *Primary Examiner*.

UNITED STATES PATENT OFFICE
CERTIFICATE OF CORRECTION

Patent No. 3,387,820  June 11, 1968

Raymond Smith

It is hereby certified that error appears in the above numbered patent requiring correction and that the said Letters Patent should read as corrected below.

In the heading to the printed specification, lines 3 to 5, for "assignor to Continental Aviation & Engineering Corporation, Detroit, Mich., a corporation of Michigan" read -- assignor to Continental Aviation and Engineering Corporation, Detroit, Mich., a corporation of Virginia --; column 2, line 2, for "shrould" read -- shroud --; column 3, line 14, for "Uuts" read -- Nuts --.

Signed and sealed this 4th day of March 1969.

(SEAL)

Attest:

Edward M. Fletcher, Jr.
Attesting Officer

EDWARD J. BRENNER
Commissioner of Patents